US009723553B2

(12) United States Patent
Cöster et al.

(10) Patent No.: US 9,723,553 B2
(45) Date of Patent: Aug. 1, 2017

(54) METHOD, NETWORK DEVICE, COMPUTER PROGRAM AND COMPUTER PROGRAM PRODUCT FOR DETERMINING A SET OF POWER STATE PARAMETERS

(71) Applicant: TELEFONAKTIEBOLAGET L M ERICSSON (PUBL), Stockholm (SE)

(72) Inventors: Rickard Cöster, Hägersten (SE); Vincent Huang, Sollentuna (SE); Mona Matti, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 14/435,076

(22) PCT Filed: Oct. 15, 2012

(86) PCT No.: PCT/SE2012/051106
§ 371 (c)(1),
(2) Date: Apr. 10, 2015

(87) PCT Pub. No.: WO2014/062103
PCT Pub. Date: Apr. 24, 2014

(65) Prior Publication Data
US 2015/0304949 A1 Oct. 22, 2015

(51) Int. Cl.
*H04W 52/02* (2009.01)
(52) U.S. Cl.
CPC ... *H04W 52/0209* (2013.01); *H04W 52/0216* (2013.01); *H04W 52/0235* (2013.01);
(Continued)
(58) Field of Classification Search
None
See application file for complete search history.

(56) References Cited

U.S. PATENT DOCUMENTS 7,324,042 B2 *  1/2008  Werntz ............... G01S 7/2813
                                                342/159
7,760,676 B2 *  7/2010  Demirhan ......... H04W 52/0216
                                                370/311
(Continued)

FOREIGN PATENT DOCUMENTS

EP  1202495 A2  5/2002
EP  1973355 A1  9/2008
(Continued)

OTHER PUBLICATIONS

Extended European Search Report issued in corresponding application 12886574.8 dated Oct. 30, 2015, 8 pages.

*Primary Examiner* — Gregory Sefcheck
(74) *Attorney, Agent, or Firm* — Rothwell, Figg, Ernst & Manbeck, P.C.

(57) ABSTRACT

According to a first aspect, it is presented a method, performed by a network device, for determining a set of power state parameters at least partly defining when a wireless terminal is to be in an active state or a power saving state. The method comprises the steps of: obtaining at least one traffic characterization parameter; for each traffic flow, simulating a plurality of sets of power state parameters; obtaining at least one operational traffic characterization parameter; associating the operational traffic with a selected traffic flow; finding an applicable set of power state parameters by finding a set of power state parameters with a low cost, wherein the set of power state parameters are associated with the selected traffic flow; and sending the applicable set of power state parameters to the wireless terminal in operation. A corresponding network node, computer program and computer program product are also presented.

23 Claims, 5 Drawing Sheets

(52) U.S. Cl.
CPC ... *H04W 52/0251* (2013.01); *H04W 52/0258* (2013.01); *H04W 52/0261* (2013.01); *Y02B 60/50* (2013.01)

(56) References Cited

U.S. PATENT DOCUMENTS

| | | | | | |
|---|---|---|---|---|---|
| 8,023,990 | B2* | 9/2011 | Parkvall | ............... | H04W 52/58 370/311 |
| 8,229,416 | B2* | 7/2012 | Akman | ............... | H04W 24/06 455/419 |
| 8,249,004 | B2* | 8/2012 | Wang | ............... | H04L 5/0091 370/329 |
| 8,488,521 | B2* | 7/2013 | Wang | ............... | H04W 52/0225 370/328 |
| 8,654,691 | B2* | 2/2014 | Anderson | ............... | H04W 52/0232 370/310 |
| 8,780,880 | B2* | 7/2014 | Lin | ............... | H04W 72/1215 370/345 |
| 8,792,423 | B2* | 7/2014 | Lu | ............... | 370/328 |
| 8,811,222 | B2* | 8/2014 | Pajukoski | ............... | H04B 17/24 370/252 |
| 8,948,764 | B2* | 2/2015 | Dimou | ............... | H04W 36/32 455/226.2 |
| 9,069,890 | B2* | 6/2015 | Kaiser | | |
| 9,173,109 | B2* | 10/2015 | Xu | ............... | H04W 24/00 |
| 9,313,702 | B2* | 4/2016 | Virtej | ............... | H04W 24/10 |
| 9,369,960 | B2* | 6/2016 | Lee | ............... | H04W 52/0216 |
| 9,479,962 | B2* | 10/2016 | Lin | ............... | H04W 72/1215 |
| 2007/0259673 | A1* | 11/2007 | Willars | ............... | H04W 52/0225 455/453 |
| 2008/0101268 | A1 | 5/2008 | Sammour et al. | | |
| 2008/0186893 | A1 | 8/2008 | Kolding et al. | | |
| 2011/0082597 | A1* | 4/2011 | Meagher | ............... | H02J 3/38 700/291 |
| 2012/0057513 | A1 | 3/2012 | Kong et al. | | |
| 2012/0120828 | A1* | 5/2012 | Anderson | ............... | H04W 52/0225 370/252 |
| 2012/0120843 | A1* | 5/2012 | Anderson | ............... | H04W 52/0232 370/253 |
| 2012/0124196 | A1* | 5/2012 | Brisebois | ............... | H04W 76/046 709/224 |
| 2012/0140633 | A1 | 6/2012 | Stanwood et al. | | |
| 2012/0151041 | A1 | 6/2012 | Gerber et al. | | |
| 2012/0269143 | A1* | 10/2012 | Bertrand | ............... | H04W 72/1231 370/329 |
| 2015/0215830 | A1* | 7/2015 | Dalsgaard | ............... | H04W 36/0094 455/444 |
| 2015/0304949 | A1* | 10/2015 | Coster | ............... | H04W 52/0235 370/311 |
| 2015/0351151 | A1* | 12/2015 | Huang | ............... | H04W 36/0083 370/252 |

FOREIGN PATENT DOCUMENTS

| | | |
|---|---|---|
| EP | 2120479 A1 | 11/2009 |
| WO | 2009022748 A1 | 2/2009 |
| WO | 2013060929 A1 | 5/2013 |

* cited by examiner

METHOD, NETWORK DEVICE, COMPUTER PROGRAM AND COMPUTER PROGRAM PRODUCT FOR DETERMINING A SET OF POWER STATE PARAMETERS

CROSS REFERENCE TO RELATED APPLICATION(S)

This application is a 35 U.S.C. §371 National Phase Entry Application from PCT/SE2012/051106, filed Oct. 15, 2012, the disclosure of which is incorporated by reference.

TECHNICAL FIELD

The invention relates to determining power state parameters for wireless terminals, the power state parameters at least partly defining when a wireless terminal is to be in an active state or a power saving state.

BACKGROUND

In cellular networks, wireless terminals are often battery powered. Hence power usage in wireless terminals is always under scrutiny and any reduction in power usage is beneficial for the end user and the society at large.

In order to save power in the wireless terminal, DRX (Discontinuous Reception) can be used. A DRX cycle consists of an ON duration and an OFF duration. No data can be received during the energy saving OFF duration. If data is received in downlink during the ON duration, or if data is sent via uplink at any time, the wireless terminal will enter an active state and start an inactivity timer.

DRX is configured per wireless terminal and is governed by a set of power state parameters. However, it is not evident how to set the power state parameters. On the one hand, it is desired to save power. But on the other hand, negative effects resulting from setting the wireless terminal in an inactive state, even temporarily, should be avoided if possible.

The current solutions to setting the power state parameters are based on selecting power state parameters based on service class (e.g. Voice over Internet Protocol (VoIP), video conversation, etc.). However, it would be greatly beneficial if the setting of power state parameters could be improved even further, e.g. in order to save battery consumption.

SUMMARY

It is an object to improve how power state parameters are determined for operational traffic.

According to a first aspect, it is presented a method, performed by a network device, for determining a set of power state parameters at least partly defining when a wireless terminal is to be in an active state or a power saving state. The method comprises the steps of: for each one of a plurality of traffic flows to or from a wireless terminal, obtaining at least one traffic characterisation parameter; for each traffic flow, simulating a plurality of sets of power state parameters on the captured traffic flow, wherein, for each set of power state parameters, a cost is evaluated; obtaining at least one operational traffic characterisation parameter based on operational traffic to or from a wireless terminal in operation; associating the operational traffic with a selected traffic flow, selected from the plurality of traffic flows using the at least one operational traffic characterisation parameter; finding an applicable set of power state parameters by finding a set of power state parameters with a low cost, wherein the set of power state parameters are associated with the selected traffic flow; and sending the applicable set of power state parameters to the wireless terminal in operation.

Examples of power saving states two states related to discontinuous reception (DRX): a short DRX state and a long DRX state both. Moreover an RRC_IDLE state is also a power saving state. Each one of the power saving states use, on average, less power than the active state.

By simulating a plurality sets of state parameters and associating these with traffic characterisation parameters, the simulating can be done prior to the operational traffic occurring. In this way, a good (or even optimal for the simulated sets of power state parameters) set of power state parameters can be found, associated with the traffic characterisation parameter. In this way, the operational traffic can be characterised and the good (or optimal) set of power state parameters can be applied with low computational cost at the time when the operational traffic occurs.

The method may comprise the step of: capturing a plurality of traffic flows to or from a wireless terminal; and the captured traffic flows may be used in the step of obtaining at least one traffic characterisation parameter. By capturing the plurality of traffic flows, such as IP (Internet Protocol) headers and arrival times, more analysis can be done offline, with less pressure on time and processing.

The at least one traffic characterisation parameter and the at least one operational traffic characterisation parameter may each comprise at least one parameter based on inter packet arrival times. Inter packet arrival times has been found to be a suitable traffic characterisation parameter, particularly for streaming content, such as streaming video. Moreover, since power state parameters often relate to on and off periods, such as in DRX, the power state parameters are related to inter packet arrival times, it is beneficial to perform traffic characterisation based on a time related measurement such as inter packet arrival times.

The at least one traffic characterisation parameter and the at least one operational traffic characterisation parameter may each comprise at least one parameter selected from the group consisting of service type, packet rate, burst length and burst size.

In the step of simulating, the cost may be evaluated such that the cost is lower for lower power usage in the wireless terminal with maintained packet delay. In this way, the method will tend to apply power state parameters with lower power usage in the wireless terminal.

In the step of simulating, the cost may be evaluated such that the cost is lower for lower resource usage in a network device with maintained packet delay. In this way, the method will tend to apply power state parameters with lower resource usage in the radio the network device.

Each set of power state parameters may comprise at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

The step of finding may comprise finding a set of power state parameters with a minimum cost. In other words, from simulations, the set with the minimum cost is selected, optimising power state parameters based on the cost evaluation.

The step of sending the applicable set of power state parameters may comprise sending the applicable set of power state parameters to the wireless terminal in operation only when the applicable set of power state parameters differ more than a threshold amount from a currently active set of power state parameters of the wireless terminal in operation. In this way, power state parameters are only changed when they differ significantly, i.e. more than the threshold amount, thereby ignoring negligible changes.

The step of sending the applicable set of power state parameters may comprise sending the applicable set of power state parameters to the wireless terminal in operation only when the applicable set of power state parameters differ from a currently active set of power state parameters of the wireless terminal in operation for more than a threshold duration. In this way, power state parameters are only changed when they are not transient, i.e. persistent more than the threshold duration, thereby ignoring transient variations.

According to a second aspect, it is presented a network device arranged to determine a set of power state parameters at least partly defining when a wireless terminal is to be in an active state or a power saving state. The network device comprises: a processor; and a computer program product storing instructions that, when executed by the processor, causes the network device to: for each one of a plurality of traffic flows to or from a wireless terminal, obtain at least one traffic characterisation parameter; for each traffic flow, simulate a plurality of sets of power state parameters on the captured traffic flow, wherein, for each set of power state parameters, a cost is evaluated; obtain at least one operational traffic characterisation parameter based on operational traffic to or from a wireless terminal in operation; associate the operational traffic with a selected traffic flow, selected from the plurality of traffic flows using the at least one operational traffic characterisation parameter; find an applicable set of power state parameters by finding a set of power state parameters with a low cost, wherein the set of power state parameters are associated with the selected traffic flow; and send the applicable set of power state parameters to the wireless terminal in operation.

The instructions may comprise instructions to: capture a plurality of traffic flows to or from a wireless terminal; and the captured traffic flows may be used by the instructions to obtain at least one traffic characterisation parameter.

The at least one traffic characterisation parameter and the at least one operational traffic characterisation parameter may each comprise at least one parameter based on inter packet arrival times.

The at least one traffic characterisation parameter and the at least one operational traffic characterisation parameter may each comprise at least one parameter selected from the group consisting of service type, packet rate, burst length and burst size.

The instructions to simulate comprise instructions to evaluate the cost such that the cost is lower for lower power usage in the wireless terminal with maintained packet delay.

The instructions to simulate comprise instructions to evaluate the cost such that the cost is lower for lower resource usage in a network device with maintained packet delay.

Each set of power state parameters may comprise at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

The instructions to find may comprise instructions to find a set of power state parameters with a minimum cost.

The instructions to send may comprise instructions to send the applicable set of power state parameters to the wireless terminal in operation only when the applicable set of power state parameters differ more than a threshold amount from a currently active set of power state parameters of the wireless terminal in operation.

The instructions to send may comprise instructions to send the applicable set of power state parameters to the wireless terminal in operation only when the applicable set of power state parameters differ from a currently active set of power state parameters of the wireless terminal in operation for more than a threshold duration.

According to a third aspect, it is presented a computer program for determining a set of power state parameters at least partly defining when a wireless terminal is to be in an active state or a power saving state. The computer program comprises computer program code which, when run on a network device, causes the network device to: capture a plurality of traffic flows to or from a wireless terminal; for each traffic flow, obtain at least one traffic characterisation parameter, based on the captured traffic flow; for each traffic flow, simulate a plurality of sets of power state parameters on the captured traffic flow, wherein, for each set of power state parameters, a cost is evaluated; obtain at least one operational traffic characterisation parameter based on operational traffic to or from a wireless terminal in operation; associate the operational traffic with a selected traffic flow, selected from the plurality of traffic flows using the at least one operational traffic characterisation parameter; find an applicable set of power state parameters by finding a set of power state parameters with a low cost, wherein the set of power state parameters are associated with the selected traffic flow; and send the applicable set of power state parameters to the wireless terminal in operation.

The computer program code may comprise computer program code to: capture a plurality of traffic flows to or from a wireless terminal; and the captured traffic flows may be used by the computer program code to obtain at least one traffic characterisation parameter.

The at least one traffic characterisation parameter and the at least one operational traffic characterisation parameter may each comprise at least one parameter based on inter packet arrival times.

The at least one traffic characterisation parameter and the at least one operational traffic characterisation parameter may each comprise at least one parameter selected from the group consisting of service type, packet rate, burst length and burst size.

The computer program code to simulate comprises computer program code to evaluate the cost such that the cost is lower for lower power usage in the wireless terminal with maintained packet delay.

The computer program code to simulate comprises computer program code to evaluate the cost such that the cost is lower for lower resource usage in a network device with maintained packet delay.

Each set of power state parameters may comprise at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

The computer program code to find may comprise computer program code to find a set of power state parameters with a minimum cost.

The computer program code to send may comprise computer program code to send the applicable set of power state parameters to the wireless terminal in operation only when the applicable set of power state parameters differ more than a threshold amount from a currently active set of power state parameters of the wireless terminal in operation.

The computer program code to send may comprise computer program code to send the applicable set of power state parameters to the wireless terminal in operation only when the applicable set of power state parameters differ from a currently active set of power state parameters of the wireless terminal in operation for more than a threshold duration.

According to fourth aspect, it is presented a computer program product comprising a computer program according to the third aspect and a computer readable means on which the computer program is stored.

According to a fifth aspect, it is presented a network device arranged to determine a set of power state parameters at least partly defining when a wireless terminal is to be in an active state or a power saving state. The network device comprises means for obtaining at least one traffic characterisation parameter for each one of a plurality of traffic flows to or from a wireless terminal; means for simulating a plurality of sets of power state parameters for each traffic, wherein, for each set of power state parameters, a cost is evaluated; means for obtaining at least one operational traffic characterisation parameter based on operational traffic to or from a wireless terminal in operation; means for associating the operational traffic with a selected traffic flow, selected from the plurality of traffic flows using the at least one operational traffic characterisation parameter; means for finding an applicable set of power state parameters by finding a set of power state parameters with a low cost, wherein the set of power state parameters are associated with the selected traffic flow; and means for sending the applicable set of power state parameters to the wireless terminal in operation.

The network device may comprise means for capturing a plurality of traffic flows to or from a wireless terminal; and the captured traffic flows may be used by the means for obtaining at least one traffic characterisation parameter.

The at least one traffic characterisation parameter and the at least one operational traffic characterisation parameter each may comprise at least one parameter based on inter packet arrival times.

The at least one traffic characterisation parameter and the at least one operational traffic characterisation parameter may each comprise at least one parameter selected from the group consisting of service type, packet rate, burst length and burst size.

The means for simulating may be arranged to evaluate the cost such that the cost is lower for lower power usage in the wireless terminal with maintained packet delay.

The means for simulating may be arranged to evaluate the cost such that the cost is lower for lower resource usage in a network device with maintained packet delay.

Each set of power state parameters may comprise at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

The means for finding may be arranged to find a set of power state parameters with a minimum cost.

The means for sending the applicable set of power state parameters may be arranged to send the applicable set of power state parameters to the wireless terminal in operation only when the applicable set of power state parameters differ more than a threshold amount from a currently active set of power state parameters of the wireless terminal in operation.

The means for sending the applicable set of power state parameters may be arranged to send the applicable set of power state parameters to the wireless terminal in operation only when the applicable set of power state parameters differ from a currently active set of power state parameters of the wireless terminal in operation for more than a threshold duration.

Whenever the term 'plurality' is used in herein in the description and the claims, it is to be construed as meaning more than one.

It is to be noted that any feature of the first, second, third, fourth and fifth aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, unit, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
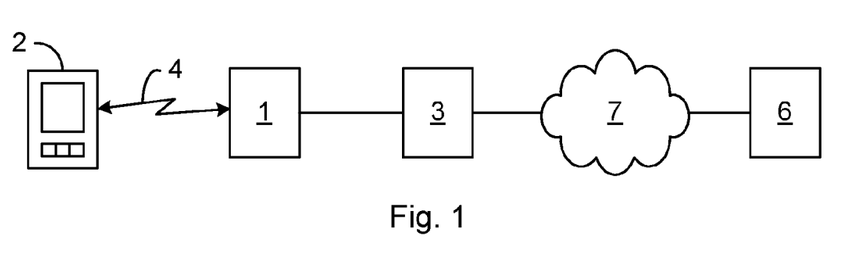
FIG. 1 is a schematic diagram illustrating an environment where embodiments presented herein can be applied.

FIG. 1 is a schematic diagram illustrating a cellular network 8 where embodiments presented herein may be applied. The cellular network 8 comprises a core network 3 and one or more radio base stations 1, here in the form of evolved Node Bs, also known as eNode Bs or eNBs. The radio base stations 1 could also be in the form of Node Bs, BTSs (Base Transceiver Stations) and/or BSSs (Base Station Subsystems), etc. The radio base stations 1 provide radio connectivity to a plurality of wireless terminals 2. The term wireless terminal is also known as mobile communication terminal, user equipment, mobile terminal, user terminal, user agent, machine-to-machine devices etc., and can be, for example, what today are commonly known as a mobile phone or a tablet/laptop with wireless connectivity or fixed mounted terminal. Moreover, the wireless terminals 2 may but do not need to, be associated with a particular end user.

The cellular network 8 may e.g. comply with any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink communication (from the wireless terminal) and downlink communication (to the wireless terminal) between each wireless terminal 2 and the radio base station 1 occur over a wireless radio interface 4. The quality of the wireless radio interface 4 to each wireless terminal 2 can vary over time and depending on the position of the wireless terminal 2, due to effects such as fading, multipath propagation, etc.

The radio base stations 1 are also connected to the core network 3 for connectivity to central functions and a wide area network 7, such as the Internet. One or more content servers 6 are also connected to the wide area network 7. In this way, the wireless terminal 2 can request content, such as video, audio, images, text, etc., from the content servers 6. When appropriate, such as for video and/or audio, the content can be delivered in a content flow by streaming using a suitable protocol, e.g. HTTP (Hypertext transfer protocol) or RTP (Real-time Transport Protocol). Control from the wireless terminal 2 to the content servers 6 can be transmitted using a suitable protocol, such as HTTP or RTSP (Real-Time Streaming Protocol).

FIGS. 2A-D are schematic histograms illustrating differences in characteristics for different content flows in the system shown in FIG. 1. The horizontal axis represents time in milliseconds and the vertical axis represents number of occurrences.

The different diagrams illustrate how a distribution of inter arrival times vary for different content flows. Inter arrival time is here to be construed as a measurement of the difference in time between two consecutive content packets (such as IP packets) of a content stream. It has been found that if the inter arrival times are accumulated per time period, e.g. per 1 ms, for hundreds or more samples, the resulting distribution can be characteristic for a content stream, e.g. for a particular content source.

Figure 2A:
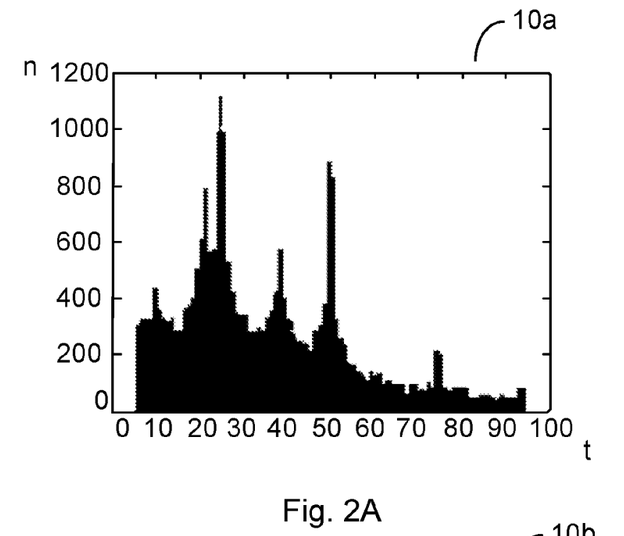
FIGS. 2A-D are schematic histograms illustrating differences in characteristics for different content flows in the system shown in FIG. 1.
Figure 2B:
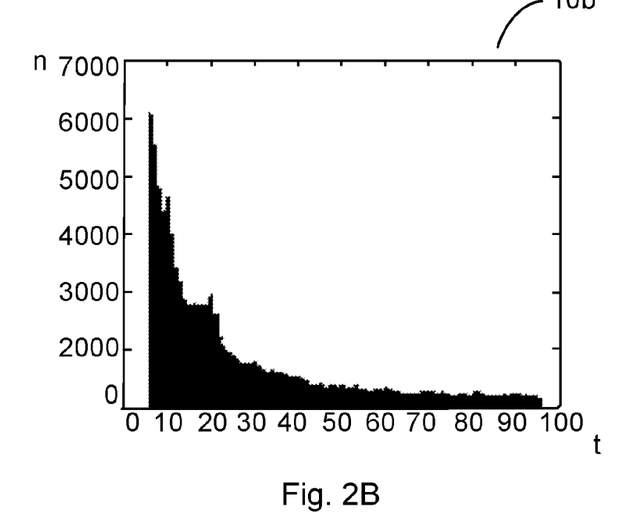
Figure 2C:
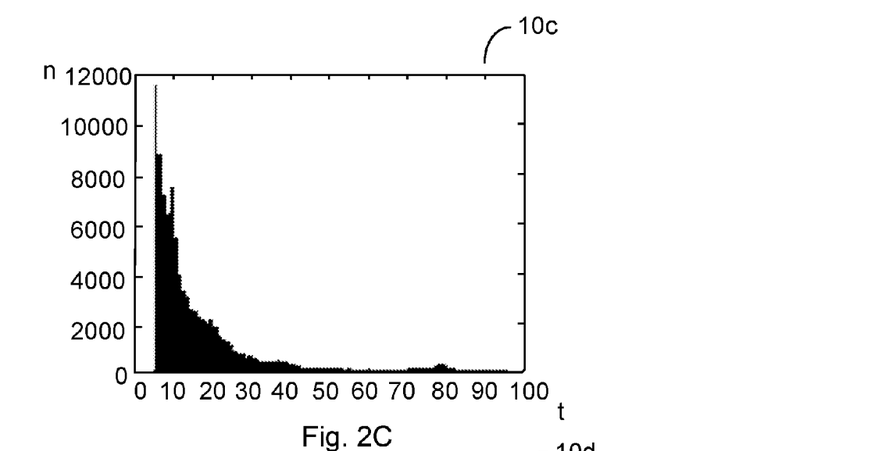
Figure 2D:
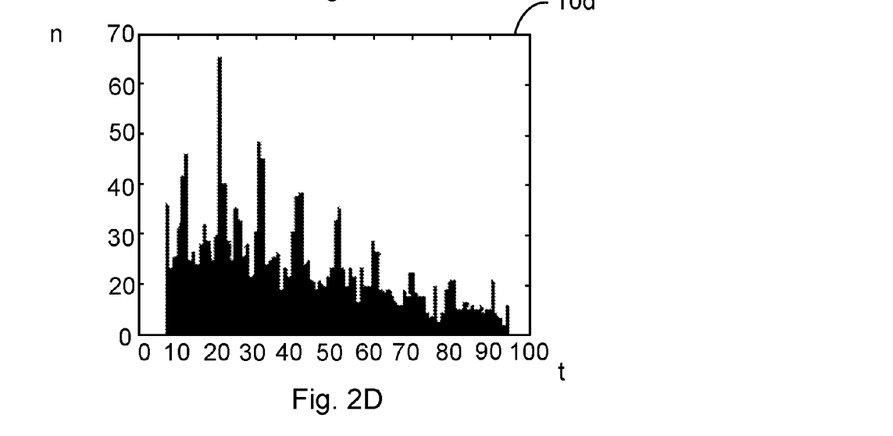

For example, FIG. 2A shows a histogram boa for inter arrival times of a content flow being a video from YouTube. FIG. 2B shows a histogram bob for inter arrival times of a content flow being a peer to peer video. FIG. 2C shows a histogram 10*c* for inter arrival times of a content flow being a video streamed over the Internet from Netflix. FIG. 2D shows a histogram 10*d* for inter arrival times of a content flow being a video streamed from an Apple service.

Hence it is possible, in at least some cases, to characterise a content flow by analysing inter arrival times. This can apply to downlink and/or uplink content flows.

Figure 3:
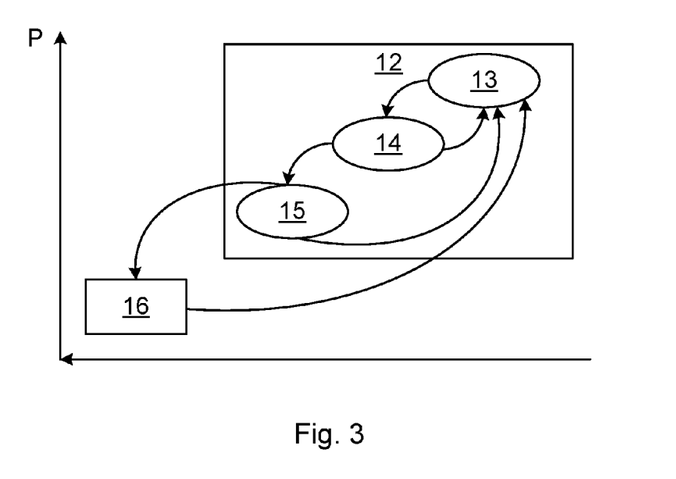
FIG. 3 is a state diagram illustrating various power states for a wireless terminal of FIG. 1.

FIG. 3 is a state diagram illustrating various power states for a wireless terminal of FIG. 1. Each state uses an average power and involves an average latency for communication. In the diagram of FIG. 3, states further to the left involve a greater latency and states further up involve greater average power usage for the wireless terminal in question.

The states are used for Discontinuous Reception (DRX), which is a feature provided in LTE/E-UTRAN (Evolved UMTS Terrestrial Radio Access Network) for power saving in the wireless terminal, reducing battery consumption. A DRX cycle consists of an ON period of an ON duration and an OFF period of an OFF duration. No data can be received during the energy saving OFF duration. If data is received in downlink during the ON duration, or if data is sent via uplink, the wireless terminal will stay awake and start an inactivity timer.

There are two main states shown in FIG. 3, an RRC_IDLE state 16 and an RRC_CONNECTED state 12. In DRX, the RRC_CONNECTED state 12 comprises three individual states: a long DRX state 15, a short DRX state 14 and an active state 13. The active state 13 is above the other states 14, 15, 16 in the diagram of FIG. 3, thereby using more power. Hence, the short DRX state 14, the long DRX state and the RRC_IDLE state 16 are throughout this description and claims known as power saving states. In other words, the power saving states 14, 15, 16 all use less power on average than the active state 13.

When in one of the long and short DRX states 14-15, the wireless terminal does not constantly monitor the PDCCH (Physical Downlink Control Channel) every TTI (Transmission Time Interval), but only during specific time intervals. During these non-active states 14-15, the wireless terminal can go into power saving OFF period for part of the time that decreases the power consumption.

Hence, two DRX cycles can be set for each wireless terminal: a short DRX cycle and a long DRX cycle for the short DRX state 14 and the long DRX state 15, respectively. When the wireless terminal is in the active state 13, a first inactivity timer is started after a downlink packet is received. When the first inactivity timer expires, the wireless terminal switches to the short DRX state 14. In the short DRX state 14, the wireless terminal can only receive packets during the ON duration.

If a packet is received while in the short DRX state 14, the wireless terminal returns to the active state 13. Otherwise, a short DRX cycle Timer is started. When the short DRX cycle Timer expires, the wireless terminal switches to the long DRX state 15. In the long DRX state, the wireless terminal can switch to the RRC_IDLE state 16 when a third inactivity timer expires. If a data packet is received during the ON Duration of the long DRX state 15, the wireless terminal returns to the active state 13 directly, without passing via the short DRX state 14. Uplink data packets always trigger the wireless terminal switching to the active state 13, if not already there.

From the RRC_IDLE state 16, a random access procedure is required to get the wireless terminal back to the RRC_CONNECTED state 12 in general, and the active state 13 in particular.

There are a number of power state parameters that can be configured in the DRX state, such as On Duration, the first inactivity timer, the short DRX cycle timer, the long DRX cycle timer, the duration of the short DRX cycle, the duration of the long DRX cycle, retransmission timer, start offset, etc. These power state parameters can be configured for each wireless terminal separately and thus at least partly define when the wireless terminal is to be in an active state or one of the power saving states 14, 15, 16. The retransmission timer parameter specifies the maximum number of consecutive PDCCH (Physical Downlink Control Channel) subframes the wireless terminal should remain active to be ready to receive an incoming retransmission after the first available retransmission time. The start offset parameter is an offset for each wireless terminal so that, in the time domain, not all wireless terminals start receiving at the same time.

Figure 4:
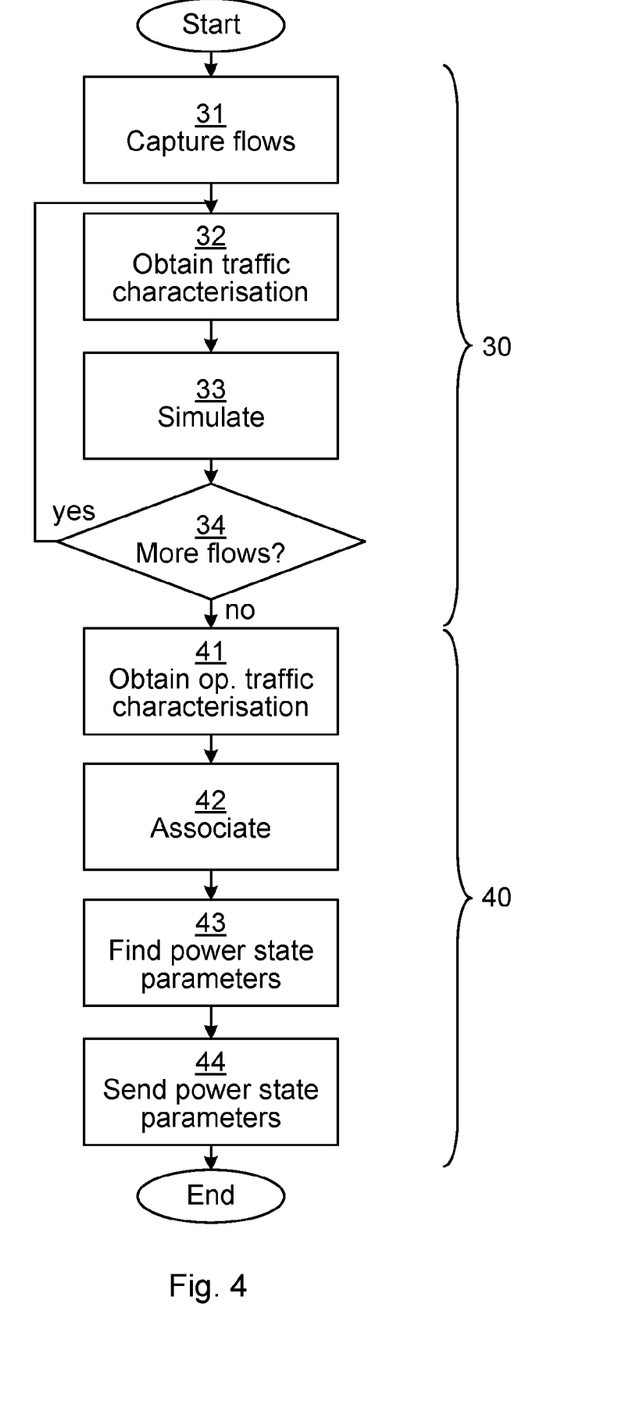
FIG. 4 is a flow chart illustrating a method performed in a network device of FIG. 1.

FIG. 4 is a flow chart illustrating a method performed in a network device (see FIGS. 7 and 8A-D below). The method determines a set of power state parameters at least partly defining when a wireless terminal is to be in an active state or a power saving state.

As mentioned above, the power state parameters can include On Duration, the first inactivity timer, the short DRX cycle timer, the long DRX cycle timer, the duration of the short DRX cycle, the duration of the long DRX cycle, retransmission timer, start offset, etc.

In one embodiment, all of these power state parameters are determined. In another embodiment, a subset of these parameters are determined by this method, such as the short DRX cycle timer, first inactivity timer, the duration of the short DRX cycle, but not parameters related to the DRX long cycle.

The method can be considered to involve a learning phase 30 and an operational phase 40. The learning phase can be performed offline, online, or in a combination thereof, depending on available resources.

In an optional capture flows step 31, a plurality of traffic flows are captured to or from a wireless terminal. In other words, downlink and/or uplink data is captured at some point between the wireless terminal and content server (6 of FIG. 1). In the capturing step 31, traffic flows are analyzed and measurements are obtained and used in an obtain traffic characterisation step 32. The captured downlink and/or uplink data can comprise IP (Internet Protocol) headers and arrival times and/or optionally data in the payload (which matches a predefined pattern, or even all data) of the packet for use in DPI (Deep Packet Inspection). For example, the capturing can capture packet arrival timestamps, etc., and store such parameter for later analysis. The capturing can perform this action on each individual packet of a traffic flow during a capture period, and store the captured data per traffic flow. This step may optionally be performed in another node than the network device.

In the obtain traffic characterisation step 32, at least one traffic characterisation parameter is obtained, based on one of the captured traffic flow. For example, the traffic characterisation parameter can be a collection of inter arrival times, as illustrated in FIGS. 2A-D above. Alternatively or additionally, one or more of other traffic characterisation parameters can be used, such as service type, packet rate, burst length and burst size. Service type can indicate the content type of the traffic flow. Examples of service types are VoIP, video streaming, audio streaming, web browsing, software downloads, etc. Packet rate indicates the rate at which packets are received. Burst length indicates a duration of a burst and burst size indicates the number of packets of a burst. A burst can be defined as a set of packets where the inter arrival time is less than a particular threshold. Optionally, deep packet inspection (DPI) can be used for the traffic characterisation.

In a simulate step 33, for each traffic flow, a plurality of sets of power state parameters are simulated on the traffic flow. For each set of power state parameters, a cost is evaluated. In one embodiment, once all sets of power state parameters have been simulated, an optimal set of power parameters are determined to be the set of parameters which has the lowest cost. By preforming this step, the cost can be evaluated for a great number of sets of power parameters, increasing the chance of finding a set of power parameters which improves performance dramatically compared to default configuration of DRX.

In one embodiment, the cost is evaluated such that the cost is lower for lower power usage in the wireless terminal with maintained packet delay. As will be shown below, power (and thus battery) resources can be saved on the wireless terminal, while still delivering packets within a packet delay budget, i.e. with no or negligible average effect on delay.

In one embodiment, the cost is evaluated such that the cost is lower for lower resource usage in the radio base station with maintained packet delay. This can be used to, e.g. freeing up space in expensive caches in the radio base station.

In one embodiment, the cost has one or more of three cost components; packet delay, battery saving and hardware saving. Packet delay can e.g. be defined as an increase or decrease in packet delay. Battery Saving can be defined as a function of the OFF period and ON period of the wireless terminal, for example the ratio OFF/ON (OFF is power saving state, ON is receiving state). Hardware Saving can be defined as a measurement on how much hardware in the radio base station is saved.

The cost is thus calculated using a cost function, and by customising the cost function, a desired optimisation of the power state parameters (e.g. for DRX) can be obtained.

In a conditional more flows 34 step, it is determined whether there are any more traffic flows that have not been processed in the obtain traffic characterisation step 32 and the simulate step 33. If there are more unprocessed traffic flows, the method returns to the obtain traffic characterisation step 32, to process a hitherto unprocessed traffic flow. Otherwise the method continues to an obtain operational traffic characterisation step 41.

The method may optionally pause a short or long time before continuing with the obtain operational traffic characterisation step 41. In this way, traffic flows can be characterised in advance, and even in other nodes than where the power state parameters are set. The method continues when there is operational traffic to analyse. The operational flow can be associated with another wireless terminal than the wireless terminal for which the preceding steps were concerned.

In the obtain operational traffic characterisation step 41, at least one operational traffic characterisation is obtained based on one or more operational traffic flows to or from a wireless terminal in operation. For example, the at least one operational traffic characterisation parameter can comprise a vector of inter arrival times, as illustrated in FIG. 2A-D above, or any other traffic characterisation parameter corresponding to a traffic characterisation parameter used in the obtain traffic characterisation step 32.

One example of how this can be done when the traffic characterisation parameter is inter arrival times is now explained. Firstly, a number of bins for inter arrival times are prepared, for example 0-5 ms, 5-10 ms, 10-15 ms etc., or 0-1 ms, 1-2 ms, 2-3 ms etc. up to some maximum value. Secondly, the inter arrival times of the flow are accumulated in each such bin for a predetermined period of time. Thirdly, the bins are normalised.

In one embodiment, non-linear (e.g. logarithmic) scale is used in the bins, so that eventually the bins grow larger. This is relevant because inter arrival times typically follow a Poisson distribution. In one embodiment, not only inter arrival times are represented in the bins, but also other characteristics such as how many bursts occur with a particular inter arrival time preceding it, and what is the average length of such bursts, and the average number of packets of such bursts.

In an associate step 42, the operational traffic is associated with a selected traffic flow. The selected traffic flow is one from the plurality of traffic flows mentioned in conjunction with the steps 31-34. The selection is done based on the at least one operational traffic characterisation parameter. In one embodiment, the selected traffic flow is the one of the plurality of traffic flows which is most similar to the operational traffic, with respect to the traffic characterisation parameter.

In a find power state parameters step 43, once there is a selected traffic flow, an applicable set of power state parameters is found by finding a set of power state parameters with a low cost. The set of power state parameters are thus associated with the selected traffic flow. In one embodiment, a set of power state parameters are selected with the lowest cost, such as a predetermined optimal set of power state parameters, as explained with reference to the simulate step 33 above.

In a send power state parameters step 44, the applicable set of power state parameters are sent or otherwise provided to the wireless terminal in operation.

When the power state parameters are sent to the wireless terminal, messages such as RRC CONNECTION RECONFIGURATION or RRC CONNECTION SETUP can be used. In one example, assume that the user is viewing streaming video, and that the inter arrival times of the downlink packets in the stream are characterized by bursts of data approximately every 25 milliseconds. The optimized DRX parameters can then be predicted on the basis of these inter arrival time characteristics. In this particular case, the optimized DRX parameters could for instance be such that the ON duration and INACTIVITY timers are set to very small values, for example a few milliseconds, and the Short DRX cycle length is aligned to fit the observed burst inter arrival times of 25 milliseconds. The number of short DRX cycles and the long DRX values are updated in this example case.

Optionally, the applicable set of power state parameters are sent to the wireless terminal only when the applicable set of power state parameters differ more than a threshold amount from a currently active set of power state parameters of the wireless terminal in operation. In other words, optionally, there needs to be a significant change in power state parameters for it to be valuable to send the new set of applicable set of power state parameters.

Optionally, the applicable set of power state parameters are sent to the wireless terminal only when the applicable set of power state parameters differs from a currently active set of power state parameters of the wireless terminal in operation for more than a threshold duration. In other words, optionally, there needs to be a change in power state parameters for a significant duration for it to be valuable to send the new set of applicable set of power state parameters.

It is to be noted that the method described with reference to FIG. 4 could also be performed in the wireless terminal itself. Optionally, the first four steps 31-34, i.e. the steps of the learning phase, are performed centrally in the network, and the last four steps, i.e. steps 41-44 of the operational phase 40, are performed in the wireless terminal. When performed in the wireless terminal, the send power state parameters step 44 primarily involves applying the applicable set of power state parameters. The capture flows step 31 may in one embodiment be performed in a first network device and the steps 32-34 in a second network device, which receives the result of the capture flows step 31 from the first network device.

Figure 5:
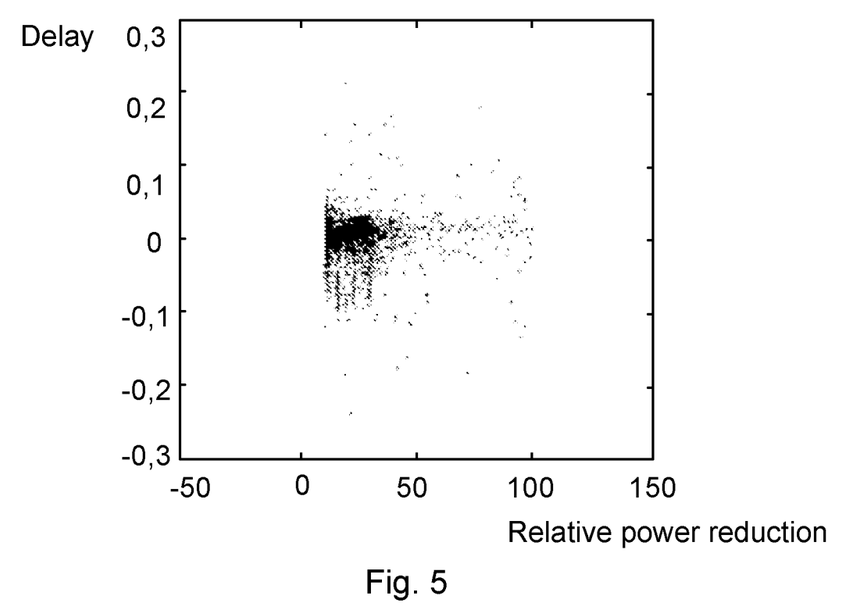
FIG. 5 is a schematic plot illustrating power saving versus delay when the method of FIG. 4 is applied to reduce power usage.

FIG. 5 is a schematic plot illustrating power saving versus delay when the method of FIG. 4 is applied to reduce power usage. This evaluation has been done by performing predictions of DRX parameters based on the characteristics of the first 10 seconds of the operational traffic flow, then using the predicted DRX parameters for the remainder of the flow, and estimating the power saving and delay of those settings. As baseline comparisons, default DRX parameter settings have been used.

The horizontal axis represents power savings in percent, relative to when the default DRX parameters are used. The vertical axis represents delay in seconds, relative to when the default DRX parameters are used.

It can be seen from the plot that the average reduced power usage is significant, and almost always positive, while, on average, the introduced delay is about zero.

Figure 6:
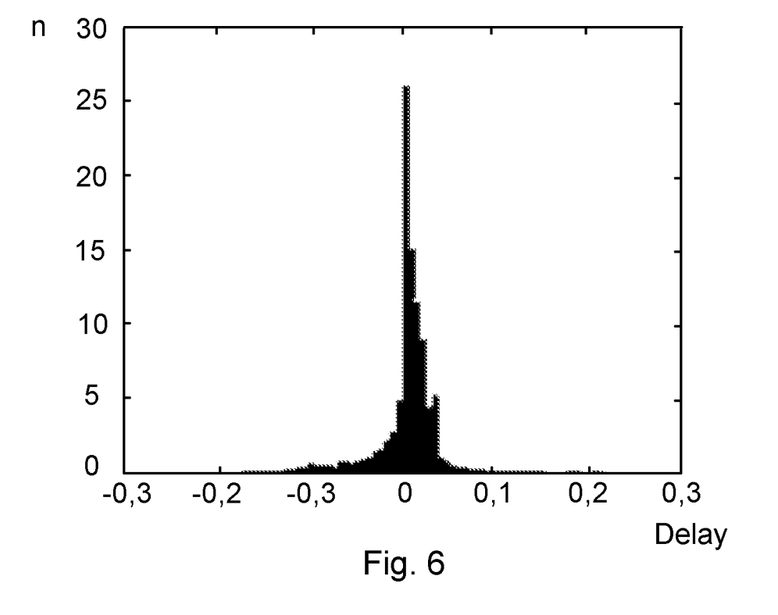
FIG. 6 is a histogram illustrating effects on delay when the method of FIG. 4 is applied to reduce power usage.

FIG. 6 is a histogram illustrating effects on delay when the method of FIG. 4 is applied to reduce power usage. The vertical axis represents a normalised count of occurrences. The horizontal axis represents delay in seconds, relative to when the default DRX parameters are used. It can here be seen that the distribution is clearly around zero, whereby no significant delay is introduced by using the method of FIG. 4 to reduce power usage.

Figure 7:
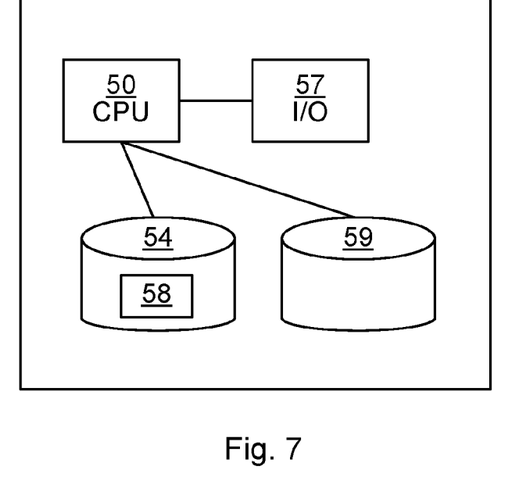
FIG. 7 is a schematic diagram illustrating some components of the network device of FIG. 1.

FIG. 7 is a schematic diagram showing some components of the network device 10 arranged to execute the method of FIG. 4. The components shown here can be components used from a host device containing the network device 10, or components for the network device 10, separate from the host device. A processor 50 is provided using any combination of one or more of a suitable central processing unit (CPU), multiprocessor, microcontroller, digital signal processor (DSP), application specific integrated circuit etc., capable of executing software instructions contained in a computer program 58 stored in a computer program product 54, e.g. in the form of a memory, but not in the form of a signal or any form of electromagnetic wave. The processor 50 can be configured to execute the method described with reference to FIG. 4 above.

The computer program product 54 is here a memory being any combination of read and write memory (RAM) and read only memory (ROM). The memory also comprises persistent storage, which, for example, can be any single one or combination of magnetic memory, optical memory, solid state memory or even remotely mounted memory. The processor 50 controls the general operation of the network device 10.

The network device 10 further comprises a data memory 59, which is a read-and-write memory. The data memory 59 may also comprises persistent storage, which, for example, can be any single one or combination of magnetic memory, optical memory, solid state memory or even remotely mounted memory. Optionally, the computer program product 54 and the data memory 59 can form part of the same memory device.

The network device 10 further comprises an I/O interface 57 for communicating with external entities, e.g. to be able to capture traffic flows. Other components of the network device 10 are omitted in order not to obscure the concepts presented herein FIGS. 8A-D are schematic diagram illustrating various locations where the network device of FIG. 7 can be implemented. The network device 10 determines a set of power state parameters for one or more wireless terminals, using traffic flows. Hence, the network device can be located in, or in conjunction to, any host device anywhere along the path between the end wireless terminal 2 and the content server 6 (FIG. 1).

Figure 8A:
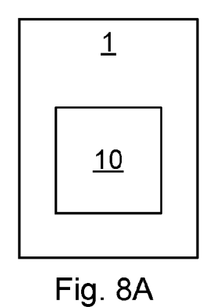
FIGS. 8A-D are schematic diagram illustrating various locations where the network device of FIG. 7 can be implemented.

In FIG. 8A, an embodiment is shown where the network device 10 is located in the radio base station 1.

Figure 8B:
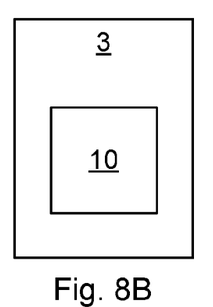

In FIG. 8B, an embodiment is shown where the network device 10 is located in the core network, 3, such as in or by an SGSN (Serving GPRS (General Packet Radio Service) Support Node), a GGSN (Gateway GPRS Support Node), a Serving Gateway, or a Packet Data Network Gateway.

Figure 8C:
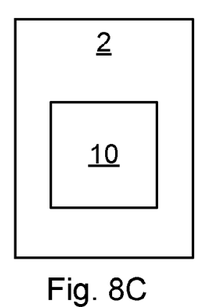
Figure 8D:
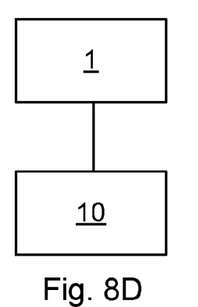

In FIG. 8C, an embodiment is shown where the network device 10 is located in the wireless terminal 2. In FIG. 8D, an embodiment is shown where the network device 10 is located with direct communication with the radio base station 1.

Optionally, different network devices 10 or different parts of the network device 10 can be housed in multiple devices.

Figure 9:
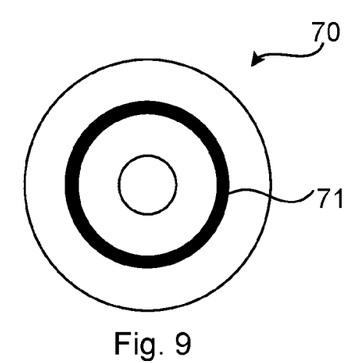
FIG. 9 shows one example of a computer program product 70 comprising computer readable means.

FIG. 9 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 7. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed by a network device, for providing to a wireless terminal a set of power state parameters, the method comprising:

for each one of a plurality of traffic flows, obtaining a traffic characterization parameter, wherein the plurality of traffic flows comprises a first traffic flow and a second traffic flow, and obtaining a traffic characterization parameter for each one of the plurality of traffic flows comprises obtaining a first traffic characterization parameter for the first traffic flow and obtaining a second traffic characterization parameter for the second traffic flow;

for each one of the plurality of traffic flows, identifying an optimal set of power state parameters for the traffic flow by performing a process comprising:
1) simulating a first set of power state parameters on the first traffic flow to produce first simulation results;
2) determining a first cost based on the first simulation results;
3) simulating a second set of power state parameters on the first traffic flow to produce second simulation results;
4) determining a second cost based on the second simulation results;
5) determining whether the first cost is less than second cost;
6) as a result of determining that the first cost is less than the second cost, identifying the first set of power state parameters as the optimal set of power state parameters for the first traffic flow;
7) simulating the first set of power state parameters on the second traffic flow to produce third simulation results;
8) determining a third cost based on the third simulation results;
9) simulating the second set of power state parameters on the second traffic flow to produce fourth simulation results;
10) determining a fourth cost based on the fourth simulation results;
11) determining whether the third cost is less than fourth cost; and
12) as a result of determining that the fourth cost is less than the third cost, identifying the second set of power state parameters as the optimal set of power state parameters for the second traffic flow;

obtaining an operational traffic characterization parameter based on operational traffic to or from the wireless terminal;

selecting one of the plurality of traffic flows based on the obtained operational traffic characterization parameter;

selecting an applicable set of power state parameters based on the selected traffic flow, wherein selecting the applicable set of power state parameters based on the selected traffic flow comprises selecting the set of power state parameters that has been identified as the optimal set of power state parameters for the selected traffic flow; and sending the applicable set of power state parameters to the wireless terminal.

2. The method according to claim 1,
wherein
the method further comprises capturing the plurality of traffic flows, and
the first traffic characterization parameter obtained for the first traffic flow is based on the first traffic flow.

3. The method according to claim 1, wherein the operational traffic characterization parameter comprises a parameter based on inter packet arrival times.

4. The method according to claim 1, wherein the operational traffic characterization parameter comprises at least one parameter selected from the group consisting of: service type, packet rate, burst length and burst size.

5. The method according to claim 1, wherein
the first simulation results comprise a power usage value indicating a power usage of a wireless terminal, and
determining the first cost based on the first simulation result comprises determining the first cost based on the power usage value.

6. The method according to claim 1, wherein
the first simulation results comprise a network resource usage value indicating a network resource usage amount, and
determining the first cost based on the first simulation result comprises determining the first cost based on the network resource usage value.

7. The method according to claim 1, wherein each set of power state parameters comprises at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

8. The method according to claim 1, wherein the operational traffic characterization parameter is a vector of inter arrival times.

9. The method according to claim 1, wherein the step of sending the applicable set of power state parameters to the wireless terminal comprises sending the applicable set of power state parameters to the wireless terminal only when the applicable set of power state parameters differ more than a threshold amount from a currently active set of power state parameters of the wireless terminal in operation, which comprises:
   determining a difference between the applicable set of power state parameters and the currently active set of power state parameters;
   comparing the determined difference to the threshold amount; and
   sending the applicable set of power state parameters to the wireless terminal in operation only when the determined difference exceeds the threshold.

10. The method according to claim 1, wherein the step of sending the applicable set of power state parameters to the wireless terminal comprises:
   determining whether the applicable set of power state parameters differ from the currently active set of power state parameters;
   determining a length of time that the wireless terminal has been using a currently active set of power state parameters;
   comparing the determined length of time to a threshold duration; and
   sending the applicable set of power state parameters to the wireless terminal as a result of determining that a) the determined length of time exceeds the threshold duration and b) the applicable set of power state parameters differ from the currently active set of power state parameters.

11. A network device arranged to provide to a wireless terminal a set of power state parameters, the network device comprising:
   a processor; and
   a computer program product storing instructions that, when executed by the processor, causes the network device to:
   for each one of a plurality of traffic flows, obtain a traffic characterization parameter, wherein the plurality of traffic flows comprises a first traffic flow and a second traffic flow, and obtaining a traffic characterization parameter for each one of the plurality of traffic flows comprises obtaining a first traffic characterization parameter for the first traffic flow and obtaining a second traffic characterization parameter for the second traffic flow;
   for each one of the plurality of traffic flows, identify an optimal set of power state parameters for the traffic flow by performing a process comprising:
      1) simulating a first set of power state parameters on the first traffic flow to produce first simulation results;
      2) determining a first cost based on the first simulation results;
      3) simulating a second set of power state parameters on the first traffic flow to produce second simulation results;
      4) determining a second cost based on the second simulation results;
      5) determining whether the first cost is less than second cost;
      6) as a result of determining that the first cost is less than the second cost, identifying the first set of power state parameters as the optimal set of power state parameters for the first traffic flow;
      7) simulating the first set of power state parameters on the second traffic flow to produce third simulation results;
      8) determining a third cost based on the third simulation results;
      9) simulating the second set of power state parameters on the second traffic flow to produce fourth simulation results;
      10) determining a fourth cost based on the fourth simulation results;
      11) determining whether the third cost is less than fourth cost; and
      12) as a result of determining that the fourth cost is less than the third cost, identifying the second set of power state parameters as the optimal set of power state parameters for the second traffic flow;
   obtain an operational traffic characterization parameter based on operational traffic to or from the wireless terminal;
   select one of the plurality of traffic flows based on the obtained operational traffic characterization;
   select an applicable set of power state parameters based on the selected traffic flow, wherein selecting the applicable set of power state parameters based on the selected traffic flow comprises selecting the set of power state parameters that has been identified as the optimal set of power state parameters for the selected traffic flow; and
   send the applicable set of power state parameters to the wireless terminal.

12. The network device according to claim 11, wherein the instructions comprises instructions for
   capturing the plurality of traffic flows, wherein
   the first traffic characterization parameter obtained for the first traffic flow is based on the first traffic flow.

13. The network device according to claim 11, wherein the operational traffic characterization parameter comprises a parameter based on inter packet arrival times.

14. The network device according to claim 11, wherein the operational traffic characterization parameter comprises at least one parameter selected from the group consisting of: service type, packet rate, burst length and burst size.

15. The network device according to claim 11, wherein
   the first simulation results comprise a power usage value indicating a power usage of a wireless terminal, and
   determining the first cost based on the first simulation result comprises determining the first cost based on the power usage value.

16. The network device according to claim 11, wherein
   the first simulation results comprise a network resource usage value indicating a network resource usage amount, and
   determining the first cost based on the first simulation result comprises determining the first cost based on the network resource usage value.

17. The network device according to claim 11, wherein each set of power state parameters comprises at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

18. The network device according to claim 11, wherein the operational traffic characterization parameter is a vector of inter arrival times.

19. The network device according to claim 11, wherein the instructions to send comprise instructions to send the applicable set of power state parameters to the wireless terminal in operation only when the applicable set of power state parameters differ more than a threshold amount from a currently active set of power state parameters of the wireless terminal in operation.

20. The network device according to claim 11, wherein the instructions to send comprise instructions to send the applicable set of power state parameters to the wireless terminal in operation only when the applicable set of power state parameters differ from a currently active set of power state parameters of the wireless terminal in operation for more than a threshold duration.

21. A computer program product comprising a non-transitory computer readable medium storing a computer program for determining a set of power state parameters at least partly defining when a wireless terminal is to be in an active state or a power saving state, the computer program comprising computer program code which, when run on a network device, causes the network device to:
  for each one of a plurality of traffic flows, obtain a traffic characterization parameter, wherein the plurality of traffic flows comprises a first traffic flow and a second traffic flow, and obtaining a traffic characterization parameter for each one of the plurality of traffic flows comprises obtaining a first traffic characterization parameter for the first traffic flow and obtaining a second traffic characterization parameter for the second traffic flow;
  for each one of the plurality of traffic flows, identify an optimal set of power state parameters for the traffic flow by performing a process comprising:
    1) simulating a first set of power state parameters on the first traffic flow to produce first simulation results;
    2) determining a first cost based on the first simulation results;
    3) simulating a second set of power state parameters on the first traffic flow to produce second simulation results;
    4) determining a second cost based on the second simulation results;
    5) determining whether the first cost is less than second cost;
    6) as a result of determining that the first cost is less than the second cost, identifying the first set of power state parameters as the optimal set of power state parameters for the first traffic flow;
    7) simulating the first set of power state parameters on the second traffic flow to produce third simulation results;
    8) determining a third cost based on the third simulation results;
    9) simulating the second set of power state parameters on the second traffic flow to produce fourth simulation results;
    10) determining a fourth cost based on the fourth simulation results;
    11) determining whether the third cost is less than fourth cost; and
    12) as a result of determining that the fourth cost is less than the third cost, identifying the second set of power state parameters as the optimal set of power state parameters for the second traffic flow;
  obtain an operational traffic characterization parameter based on operational traffic to or from the wireless terminal;
  select one of the plurality of traffic flows based on the obtained operational traffic characterization;
  select an applicable set of power state parameters based on the selected traffic flow, wherein selecting the applicable set of power state parameters based on the selected traffic flow comprises selecting the set of power state parameters that has been identified as the optimal set of power state parameters for the selected traffic flow; and
  send the applicable set of power state parameters to the wireless terminal.

22. A method, performed by a network device, for providing to a wireless terminal a set of power state parameters, the method comprising:
  for each one of a plurality of traffic flows, obtaining a traffic characterization parameter;
  for each one of the plurality of traffic flows, simulating a plurality of sets of power state parameters on the traffic flow, wherein, for each set of power state parameters, a cost is evaluated;
  obtaining an operational traffic characterization parameter based on operational traffic to or from the wireless terminal;
  associating the operational traffic with a selected traffic flow, selected from the plurality of traffic flows using the operational traffic characterization parameter;
  finding an applicable set of power state parameters by finding a set of power state parameters with a low cost, wherein the set of power state parameters are associated with the selected traffic flow; and
  sending the applicable set of power state parameters to the wireless terminal, wherein
  the step of associating the operational traffic with a selected traffic flow, selected from the plurality of traffic flows using the at least one operational traffic characterization parameter comprises: i) determining which one of the plurality of traffic flows is most similar to the operational traffic flow based on the operational traffic characterization and the obtained traffic characterization parameters; and ii) selecting from the plurality of traffic flows the traffic flow that is determined to be most similar to the operational traffic flow,
  the plurality of sets of power state parameters comprises a first set of power state parameters and a second set of power state parameters,
  the plurality of traffic flows comprises a first traffic flow and a second traffic flow, and
  the step of, for each traffic flow, simulating a plurality of sets of power state parameters on the traffic flow, wherein, for each set of power state parameters, a cost is evaluated comprises:
    performing a first simulation on the first traffic flow using the first set of power state parameters;
    determining, based on the first simulation, one of: a first power usage amount and a first network device resource usage;
    determining a first cost based on one of the determined first power usage amount and the determined first network device resource usage;
    associating the first cost with the first traffic flow and the first set of power state parameters;
    performing a second simulation on the first traffic flow using the second set of power state parameters;

determining, based on the second simulation, one of: a second power usage amount and a second network device resource usage;

determining a second cost based on of the determined second power usage amount and the determined second network device resource usage; and associating the second cost with the first traffic flow and the second set of power state parameters.

23. A method, performed by a network device, for providing to a wireless terminal a set of power state parameters, the method comprising:

for each one of a plurality of traffic flows, obtaining a traffic characterization parameter;

for each one of the plurality of traffic flows, simulating a plurality of sets of power state parameters on the traffic flow, wherein, for each set of power state parameters, a cost is evaluated;

obtaining an operational traffic characterization parameter based on operational traffic to or from the wireless terminal;

associating the operational traffic with a selected traffic flow, selected from the plurality of traffic flows using the operational traffic characterization parameter;

finding an applicable set of power state parameters by finding a set of power state parameters with a low cost, wherein the set of power state parameters are associated with the selected traffic flow; and sending the applicable set of power state parameters to the wireless terminal, wherein the step of associating the operational traffic with a selected traffic flow, selected from the plurality of traffic flows using the at least one operational traffic characterization parameter comprises: i) determining which one of the plurality of traffic flows is most similar to the operational traffic flow based on the operational traffic characterization and the obtained traffic characterization parameters; and ii) selecting from the plurality of traffic flows the traffic flow that is determined to be most similar to the operational traffic flow, the step of finding the applicable set of power state parameters by finding the set of power state parameters with the low cost, wherein the set of power state parameters are associated with the selected traffic flow, comprises:

determining a first cost associated with the selected traffic flow;

determining a second cost associated with the selected traffic flow;

determining whether the first cost is less than the second cost;

as a result of determining that the first cost is less than the second cost, determining a set of power state parameters associated with the first cost; and selecting the set of power state parameters associated with the first cost as the applicable set of power state parameters.

* * * * *